(12) United States Patent
Liu et al.

(10) Patent No.: US 7,967,210 B2
(45) Date of Patent: Jun. 28, 2011

(54) IMAGING BAR CODE READER HAVING LIGHT EMITTING DIODE FOR GENERATING A FIELD OF VIEW

(75) Inventors: Rong Liu, Selden, NY (US); Ming Yu, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 779 days.

(21) Appl. No.: 11/948,152

(22) Filed: Nov. 30, 2007

(65) Prior Publication Data

US 2009/0140050 A1 Jun. 4, 2009

(51) Int. Cl.
*G06K 7/10* (2006.01)
(52) U.S. Cl. ............... 235/462.42; 235/462.01
(58) Field of Classification Search ............ 235/462.11, 235/462.28, 462.42
See application file for complete search history.

(56) References Cited

U.S. PATENT DOCUMENTS

| | | | |
|---|---|---|---|
| 6,042,012 A | 3/2000 | Olmstead et al. | |
| 2004/0007622 A1* | 1/2004 | Dvorkis et al. | 235/462.32 |
| 2004/0031848 A1* | 2/2004 | Leach | 235/454 |
| 2004/0114254 A1 | 6/2004 | Kimura et al. | |
| 2005/0092841 A1* | 5/2005 | Barkan | 235/462.25 |
| 2006/0164736 A1* | 7/2006 | Olmstead et al. | 359/793 |
| 2006/0196944 A1 | 9/2006 | Maeda et al. | |
| 2007/0228176 A1 | 10/2007 | Vinogradov et al. | |
| 2007/0268694 A1 | 11/2007 | Bailey et al. | |

OTHER PUBLICATIONS

International Search Report and the Written Opinion of the International Searching Authority for international Application No. PCT/US2008/083166 mailed Jan. 6, 2009.

* cited by examiner

*Primary Examiner* — Seung H Lee
*Assistant Examiner* — Sonji Johnson

(57) ABSTRACT

The disclosed bar code reader has an imaging system that includes a light monitoring pixel array and a focusing lens that is fixed with respect to the pixel array for transmitting an image of the target object onto the pixel array. The bar code reader also includes an illumination system for illuminating the target having a light source for emitting a diverging light outwardly from a light source location and a lens for bending the light including a first surface facing the light source and a second surface facing the target for bending the light emitted by the light source to more uniformly illuminate a rectangular, generally planar region at the target within the barcode reader's field of view.

14 Claims, 5 Drawing Sheets

IMAGING BAR CODE READER HAVING LIGHT EMITTING DIODE FOR GENERATING A FIELD OF VIEW

FIELD OF THE INVENTION

The present invention relates to an imaging-based bar code reader having a field of view illuminating system including a light emitting diode.

BACKGROUND OF THE INVENTION

Various electro-optical systems have been developed for reading optical indicia, such as bar codes. A bar code is a coded pattern of graphical indicia comprised of a matrix or series of bars and spaces of varying widths, the bars and spaces having differing light reflecting characteristics. Systems that read and decode bar codes employing CCD or CMOS-based imaging systems are typically referred to as imaging-based bar code readers or bar code scanners.

Imaging systems include CCD arrays, CMOS arrays, or other imaging pixel arrays having a plurality of photosensitive elements or pixels. Light reflected from a target image, e.g., a target bar code is focused through a lens of the imaging system onto the pixel array. Output signals from the pixels of the pixel array are digitized by an analog-to-digital converter. Decoding circuitry of the imaging system processes the digitized signals and attempts to decode the imaged bar code.

The ability of an imaging system to successfully decode an imaged bar code is dependent upon the ability to satisfactorily capture a clear image of the target bar code that is focused onto the pixel array and this in turn may be dependent on uniform illumination of a target bar code.

For many imaging applications, a useful field of view (FOV) is rectangular as dictated by the pixel array's aspect ratio. The illumination pattern emitted by the bar code reader should cover the rectangular FOV with good uniformity in light intensity.

Without a lens, a light emitting diode generates a much wider illumination pattern than is necessary thus wasting light. Furthermore, the pattern is not uniform enough. In the prior art a lens is used to match the LED to the bar code reader's field of view. This still produces a round illumination pattern and to cover the entire rectangular FOV light is still wasted reducing the energy efficiency and causing stray light that provides no useful function.

SUMMARY

An exemplary system is used with an imaging based barcode reader for imaging a target and has an imaging system that includes a light monitoring pixel array and an optical system having one or more focusing lenses positioned with respect to the pixel array to transmit an image of a target object toward the pixel array.

The exemplary system includes an illumination system having a light source such as a light emitting diode (LED) for illuminating a target within a field of view defined by the optical system. A drive circuit coupled to the light emitting diode energizes the light emitting diode. A lens has a first surface facing the light emitting diode and a second surface facing the target. In the exemplary system the lens has one input surface positioned with respect to a light source such as the light emitting diode and a generally non-rotationally symmetric polynomial output surface facing the target. This lens bends the light to create a field of view with good efficiency and having uniformity across the field of view. By adjustment of the lens input and output surfaces uniformity across a generally rectangular region is obtained.

These and other objects advantages and features of the invention will become further understood from reference to the accompanying description of an exemplary embodiment of the invention when considered in conjunction with the accompanying drawings.

DETAILED DESCRIPTION

Figure 1:
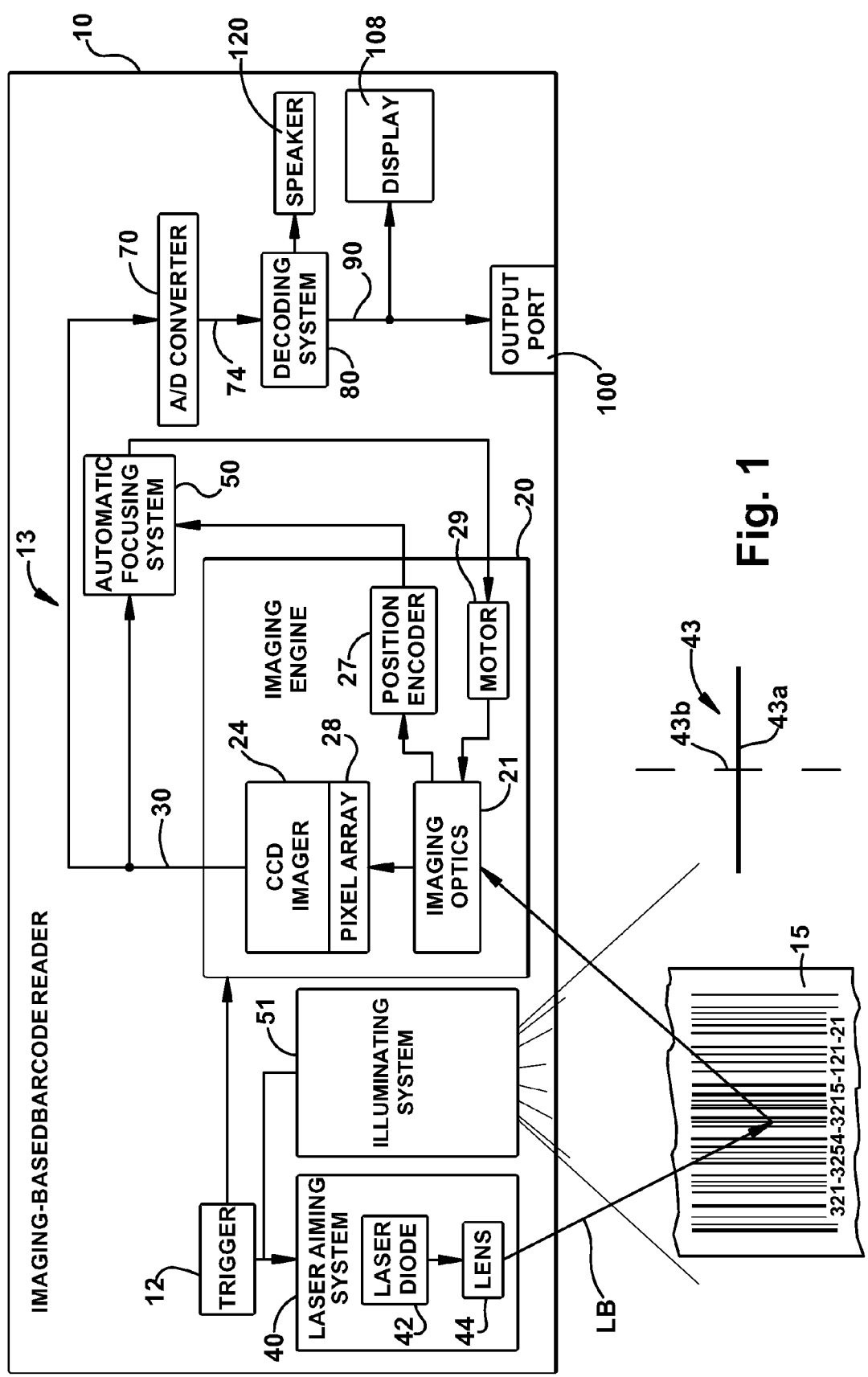
FIG. 1 is a schematic block diagram of an imaging-based bar code reader of the present invention having an automatic focusing system.
Figure 2:
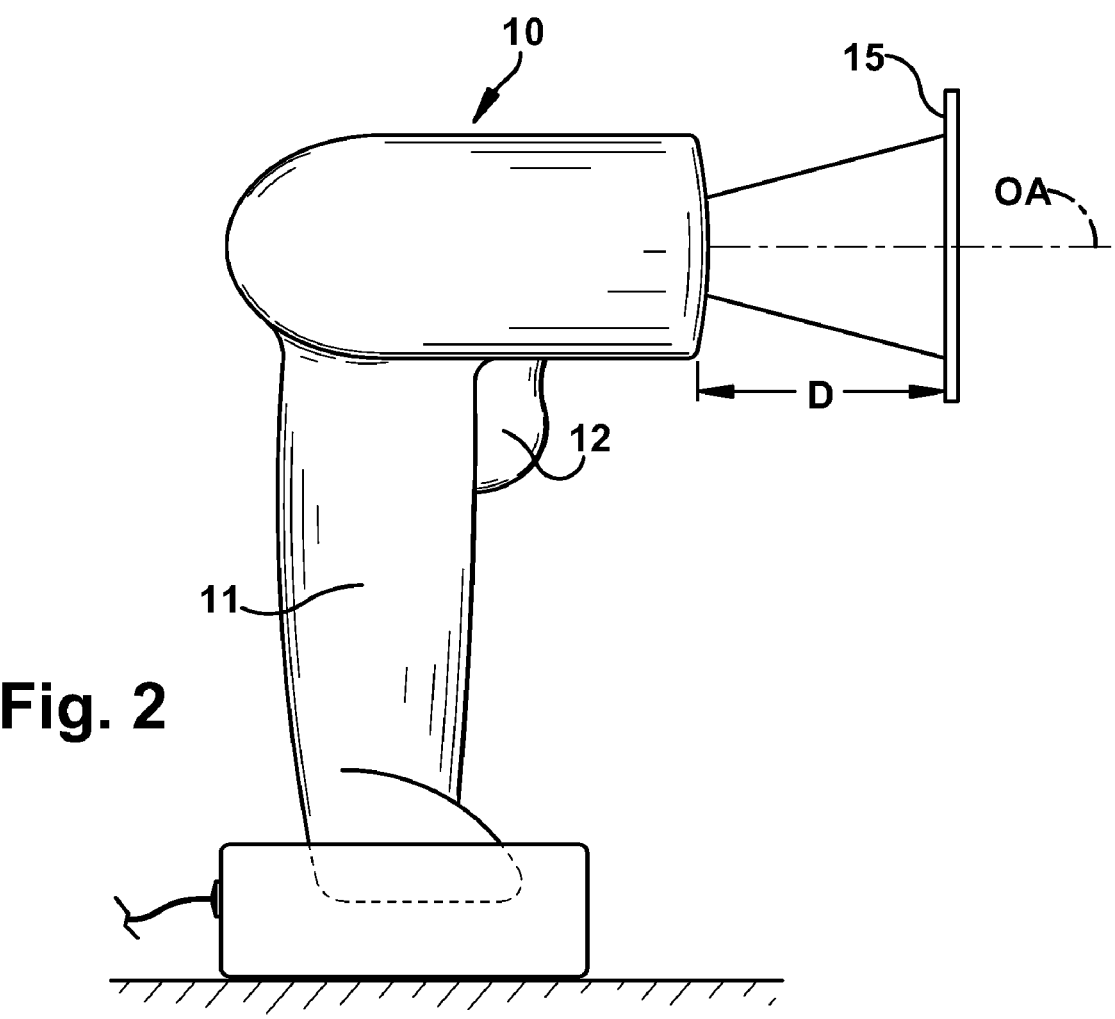
FIG. 2 is a depiction of a housing for supporting the components depicted in FIG. 1.

A block diagram of an imaging-based bar code reader 10 is shown schematically in FIG. 1. The bar code reader 10, in addition to imaging and decoding both 1D and 2D bar codes and postal codes, is also capable of capturing images and signatures. In one preferred embodiment of the present invention, the bar code reader 10 is a hand held portable reader components of which are supported within a housing 11 (FIG. 2) that can be carried and used by a user walking or riding through a store, warehouse or plant for reading bar codes for stocking and inventory control purposes.

A bar code reader of the present invention, however, may be advantageously used in connection with any type of imaging-based automatic identification system including, but not limited to, bar code readers, signature imaging acquisition and identification systems, optical character recognition systems, fingerprint identification systems and the like. It is the intent of the present invention to encompass all such imaging-based automatic identification systems.

The bar code reader 10 includes a trigger 12 coupled to bar code reader circuitry 13 for initiating reading of a target bar code 15 positioned on an object when the trigger 12 is pulled or pressed. The bar code reader 10 includes an imaging component 20 including imaging optics 21 and a CCD imager 24. One or more lenses focus light reflected from the target bar code 15 onto an array of photosensors or pixels 28 of the CCD imager 24. In one embodiment, the reader 10 includes an auto focus system 50 that moves at least one lens with a motor 29 having an output transmission coupled to the lens and whose movement is monitored with a position encoder 27. The pixels of the pixel array 28 are read out generating an analog signal at an output 30 representative of an image of whatever is focused by the imaging optics 21 onto the pixel array 28, for example, an image of the bar code 15 intersected by the reader's optical axis OA. The analog image signal at the output 30 is then digitized by an analog-to-digital converter 70 and a digitized signal at an output 74 is decoded by decoder circuitry 80. Decoded data 90, representative of the data/information coded in the bar code 15 is then output via a data output port 100 and/or displayed to a user of the reader 10 via a display 108. Upon achieving a good "read" of the bar code 15, that is, the bar code 15 was successfully imaged and decoded, a speaker 120 is activated by the circuitry 13 to indicate to the user that the bar code has been successfully read.

The reader 10 further includes an aiming pattern generator 40 that generates a visible aiming pattern 43 to aid the user in properly aiming the reader at the target bar code 15. In one preferred embodiment, the aiming generator 40 is a laser aiming apparatus. Alternatively, the aiming apparatus 40 may utilize an LED or another source of illumination known to those of skill in the art. The pattern 43 may be a pattern comprising a crosshair formed from a thick horizontal line 43a and a perpendicular thin vertical line 43b. In one preferred embodiment, the laser aiming apparatus 40 includes a laser diode 42 and a diffractive lens 44.

In the illustrated embodiment, in addition to the aiming pattern generator 40, the reader 10 includes a separate illumination system 51 having a light emitting diode 152 for shining illumination light onto the target bar code 15.

The CCD or CMOS sensors that make up the imager 24 sense light reflected back from the target surface and form pixel data corresponding to an image of the target. It is advantageous to use an array sensor that has the capability to output a portion of pixels upon request, so that the transfer time and processing time can be shortened when only a portion of the array is properly exposed. One such sensor is a CMOS array made by Micron having part number MT9M001. The pixel data from the array is converted into digital data by an A/D converter 70 that is decoded by decoding system 80 that includes a microprocessor controller. An output port or display 108 provides the results of decoding to a peripheral device (not shown) or displays them to the user. The scanner 10 also includes an illumination source (not shown) that is capable, within a prescribed scanner range, of illuminating a portion of the target surface sufficient to fill the entire two-dimensional array of sensors with data. The scanner includes an aiming pattern generator 40 that includes one or more laser diodes 42 and a focusing lens 44 (see FIG. 1) that is activated by a user actuated trigger 12.

High Intensity Illumination Source

The illumination system 51 includes a lens 140 (FIG. 3) for redirecting or bending light from a single light emitting diode 152 and illuminating the target 15 within a field of view at a focus distance D defined by the imaging optics 21. In the exemplary embodiment the light emitting diode 152 is supported by a printed circuit board 150 so that the light emitting diode 152 is positioned on a centerline of a z axis of a co-ordinate system depicted in the figures. The light emitting diode 152 is most preferably energized by a power supply (not shown) in response to actuation of the trigger 12, but could alternately be activated by a signal from a controller that co-ordinates and controls operations of the bar code reader including the decoding functions.

The lens 140 is positioned in relation to the LED 152 such that an entrance surface S1 faces the LED 152 and a surface S2 faces the target. But for the presence of the lens, light from the light emitting diode would disperse and a planar region of the target would intersect the generally spherical coverage with a non uniform coverage of light, requiring compensation and possible misidentification by the decoding electronics of the reader. A generating curve used to generate the surface S1 is rotationally symmetric and can be aspherical, such as equation 1:

$$z = \frac{Cr^2}{\left(1 + \sqrt{1 - (k+1)C^2 r^2}\right)} + \sum_i a_i r^i, \quad \text{Equation 1}$$

where $r = \sqrt{x^2 + y^2}$,

C is the radius of curvature of the base or reference sphere, k is a conic constant and the $a_i$ are the departure terms from the base or reference sphere.

Where suitable parameters for this equation are listed below:

| C | k | i | a |
|---|---|---|---|
| 0 | 0 | 2 | 0.06 |
|   |   | 4 | −0.02 |

A more generic version of equation 1 is a polynomial surface which can include rotational symmetric or asymmetric aspheres governed by equation 2:

$$z = \frac{Cr^2}{\left(1 + \sqrt{1 - (k+1)C^2 r^2}\right)} + \sum_i (a_i r^i + b_i x^i + c_i y^i), \quad \text{Equation 2}$$

where $b_i$ and $c_i$ are coefficient of the polynomial expansion terms.

The generating curve used to generate the surface S2 is non-rotationally symmetric polynomial asphere, which is a subset of a polynomial surface as described in equation 2, is also governed by and can be generated by the a polynomial such as described by equation 3:

$$z = \frac{Cr^2}{\left(1 + \sqrt{1 - (k+1)C^2 r^2}\right)} + \sum_i (a_i r^i + b_i x^i + c_i y^i), \quad \text{Equation 3}$$

where $r = \sqrt{x^2 + y^2}$,

C is the radius of curvature of the base sphere, k is a conic constant, $a_i$ are the coefficient of departure terms from the reference sphere, and $b_i$ and $c_i$ are coefficient of the polynomial departure terms from reference sphere.

Where suitable parameters for this equation ($n^{th}$ degree polynomial) are listed below:

| C | k | i | a | b | c |
|---|---|---|---|---|---|
| −0.39 | −1 | 2 | −0.195 | −0.015 | −0.073 |
|   |   | 4 | −0.004 | −0.004 | −0.017 |
|   |   | 6 | −0.001 | −0.0025 |   |
|   |   | 10 | −0.00003167 |   | −0.0003 |

Note, in equations 2 and 3 for the base sphere, the C and k are single constants. In a more general case, the equation is biconic so that the equation 4 representation is satisfied:

$$z = \frac{C_x x^2 + C_y y^2}{\left(1 + \sqrt{1 - (k_x + 1)C_x^2 x^2 - (k_y + 1)C_y^2 y^2}\right)} + \sum_i (a_i r^i + b_i x^i + c_i y^i)$$

Equation 4

Figure 3:
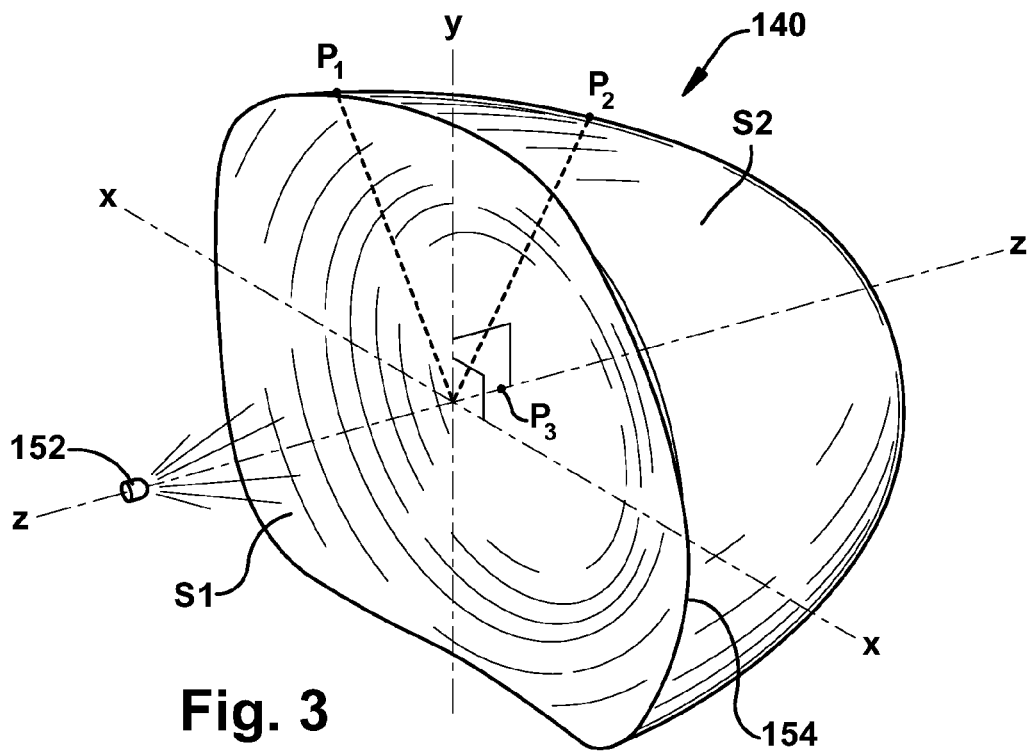
FIG. 3 and FIG. 4 are perspective view of a lens which in conjunction with a light emitting diode illuminate a reader field of view.
Figure 4:
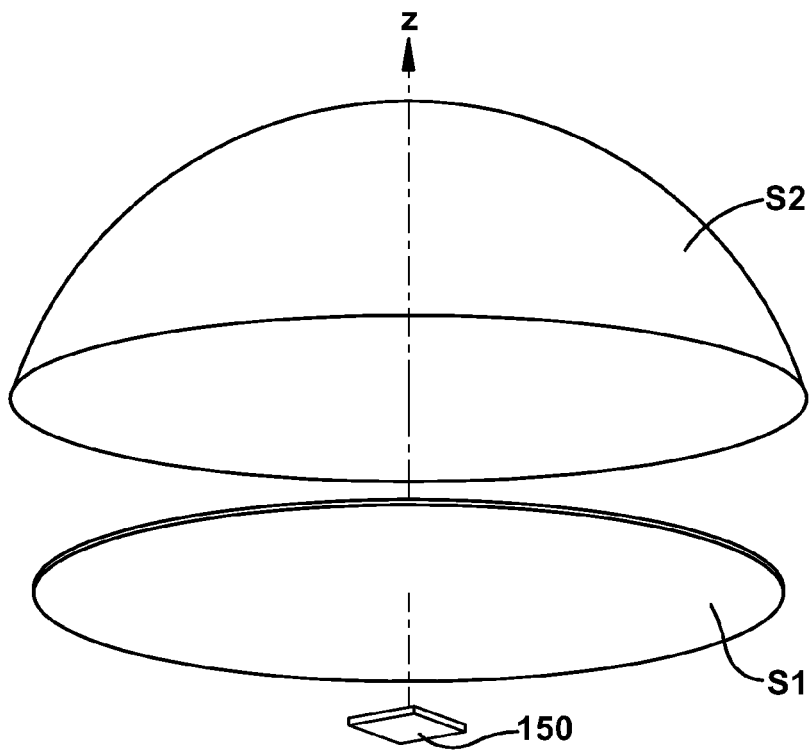

The co-ordinate axis shown in FIG. 3 has its origin in a plane where the two surfaces intersect. A curved line 154 of intersection of the surfaces S1, S2 is shown in FIG. 3. One point $P_1$ that is common to both surfaces lies on this line of intersection and a second point $P_2$ lies on the surface S2. To determine the co-ordinates in the z direction of these points one merely inserts their x and y co-ordinates into the generating equation for the particular surface and solve for z. As a straightforward example, the point $P_3$ has x and y co-ordinates of 0.0 so that their z co-ordinate is $a_2+a_4=0.04$. Proper scaling of the parameters can produce results in any units desired.

Figure 5A:
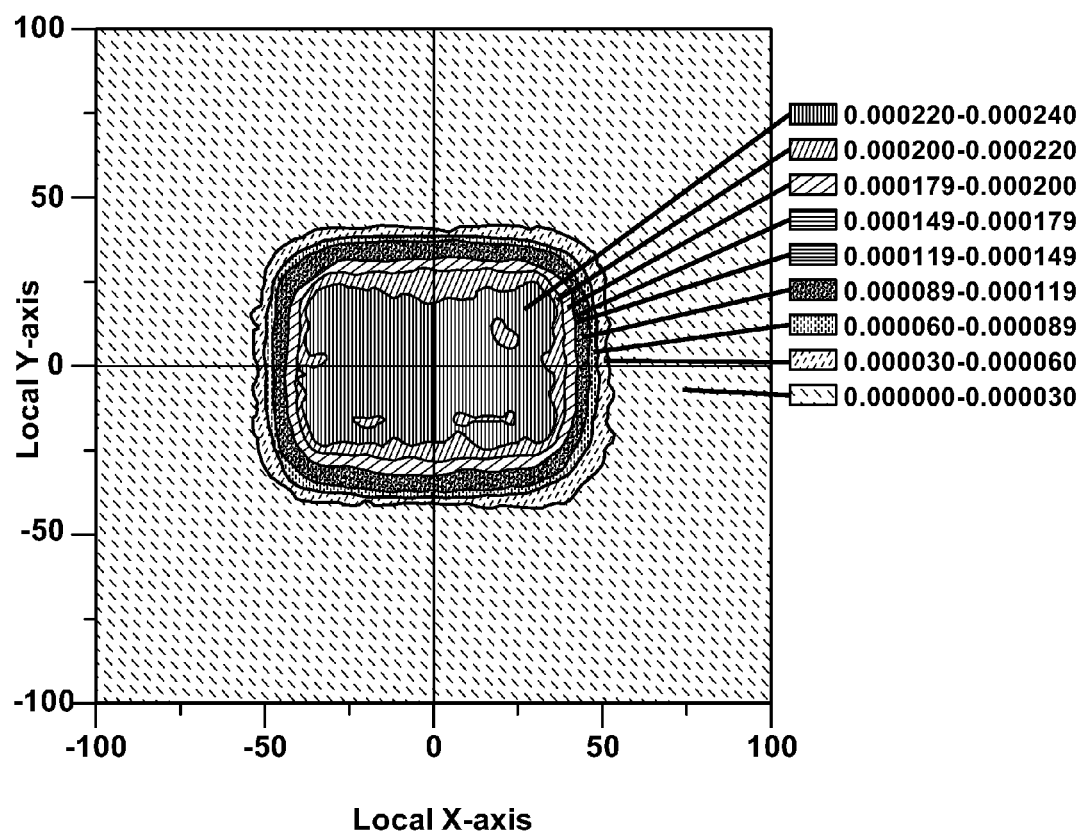
FIG. 5A-5C are depictions illustrating irradiance uniformity achieved through practice of the exemplary embodiment.
Figure 5B:
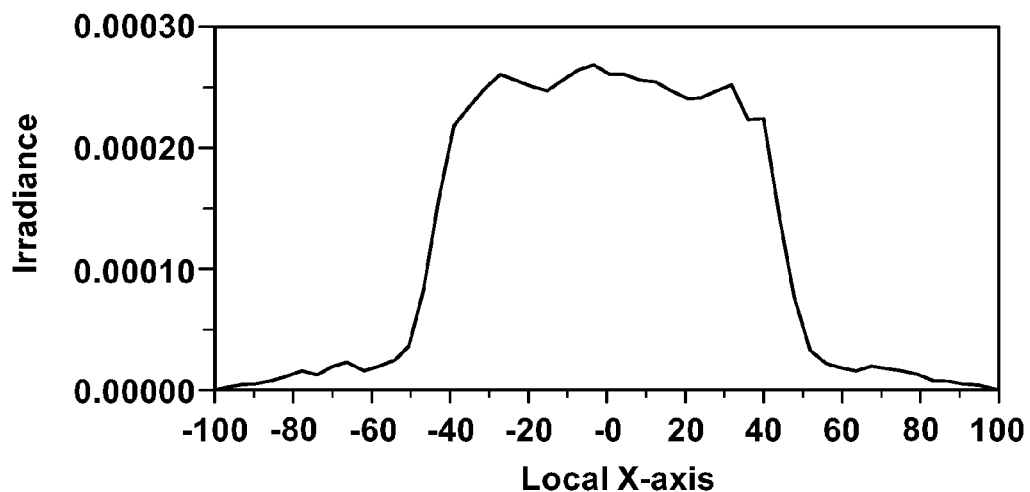
Figure 5C:
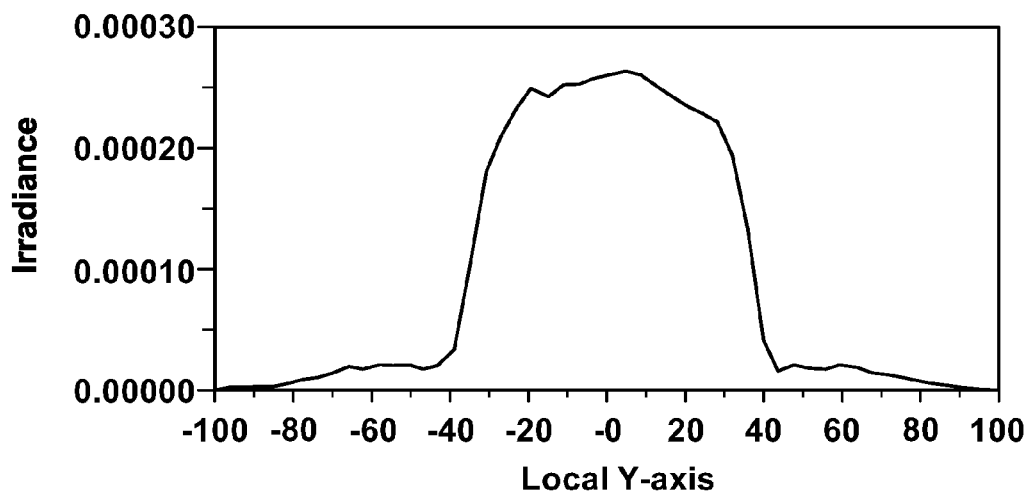

The surfaces described in equations 1 and 2 are representative and other forms are suitable so long as they bend the generally radially directed light emitted from the LED 152 to provide uniform intensity over a rectangular (possible square) region of interests within the sensor field of view. The surfaces are produce in the exemplary embodiment by diamond turning technology which produces a mold which is then used to plastic injection mold the lens 140. FIGS. 5A-5C are depictions of data gathered from a light emitting diode/lens combination at a distance of 100 mm in the x and y direction at the target plane. This data was obtained with the distance D from the from surface S2 of the lens 140 to the target of 100 mm. The LED was spaced a distance 0.2 mm from the center of the surface S1 in this test. The data illustrates good uniformity across the reader's field of view and almost complete cropping of the light outside the field of view.

The lens 140 functions to focus the diffuse or diverging light from the single source LED 152 to provide more parallel paths for the light emitted by the LED.

There are substantial advantages to use of aspheres in the illuminating system. Aspheres reduce the number of optical surfaces while eliminating aberrations and distortions while providing a compact lower mass system. Aspheres can be made using Diamond-Turning technology which makes it possible to cut precision aspheric surfaces for use in molding the lens.

While the present invention has been described with a degree of particularity, it is the intent that the invention includes all modifications and alterations from the disclosed design falling with the spirit or scope of the appended claims.

The invention claimed is:

1. A barcode reader for imaging a target comprising:
   an imaging system that includes a light monitoring pixel array for converting light reflected from the target into electrical signals;
   an optical system having one or more focusing lenses positioned with respect to the pixel array to transmit an image of the target toward said pixel array;
   an illumination system comprising a light source for illuminating the target within a field of view defined by the optical system;
   a lens having a first surface facing the light source and a second surface facing the target for bending the light emitted by the light source to more uniformly illuminate the target within the barcode reader's field of view;
   wherein one of the first and second surfaces of the lens is a generally rotationally symmetric polynomial about a lens centerline that intersects the light source; and
   wherein the other one of the first and second surfaces of the lens is a generally non-rotationally symmetric polynomial about the lens centerline and is substantially symmetric with respect to at least two reflection planes that are perpendicular to each other.

2. The barcode reader of claim 1 wherein the second surface of the lens that faces the target approximates a polynomial generating surface.

3. The barcode reader of claim 2 wherein polynomial generating surface is substantially a biconic of the general form:

$$z = \frac{C_x x^2 + C_y y^2}{\left(1 + \sqrt{1 - (k_x + 1)C_x^2 x^2 - (k_x + 1)C_y^2 y^2}\right)} + \sum_i (a_i r^i + b_i x^i + c_i y^i).$$

4. The barcode reader of claim 1 wherein the first surface of the lens that faces the source approximates a rotationally symmetric asphere.

5. The barcode reader of claim 1 wherein the illuminating system comprises a single light emitting diode, which when energized emits diverging light that is focused by said lens for uniformly illuminate a rectangular region at a plane of the target.

6. The barcode reader of claim 1 wherein the first or second surface corresponds to substantially a generating curve of the form $$z = \frac{Cr^2}{\left(1 + \sqrt{1 - (k+1)C^2 r^2}\right)} + \sum_i (a_i r^i + b_i x^i + c_i y^i).$$

7. The barcode reader of claim 1 wherein the first or second surface corresponds to substantially a generating curve of the form $$z = \frac{C_x x^2 + C_y y^2}{\left(1 + \sqrt{1 - (k_x + 1)C_x^2 x^2 - (k_y + 1)C_y^2 y^2}\right)} + \sum_i (a_i r^i + b_i x^i + c_i y^i).$$

8. The barcode reader of claim 1 wherein the light source comprises a single light emitting diode and the first surface facing the light emitting diode corresponds to substantially a generating curve of the form $$z = \sum_i a_i r^i.$$

9. The barcode reader of claim 1 wherein the illuminating system comprises a single light emitting diode, which when energized emits diverging light that is focused by said lens to produce an illumination pattern of generally parallel light rays emitting from the lens to uniformly illuminate a rectangular region at a plane of the target.

10. A method for imaging a target with an imaging based bar code reader comprising:
   positioning one or more focusing lenses with respect to a pixel array to transmit an image of the target toward said pixel array;

providing a light source for illuminating the target within a field of view defined by the focusing lenses;

interposing a lens between the light source and the target having an input surface facing the light source that is spherically symmetric about a lens center line and further having an output surface facing the target that is asymmetric about said center line and is substantially symmetric with respect to at least two reflection planes that are perpendicular to each other;

selectively energizing the light source to emit light which is focused from a diverging pattern as it passes through the lens; and converting light impinging on the pixel array reflected from the target into electrical signals for imaging.

11. The method of claim 10 wherein the lens is produced by molding a lens from plastic, wherein the mold is formed by diamond turning.

12. The method of claim 10 wherein the light source is a single light emitting diode which is placed on a centerline of the lens.

13. An imaging based barcode reader for imaging a target object comprising:

imaging means for forming an image on a light monitoring pixel array, focusing means fixed with respect to the pixel array for focusing an image of the target object to the pixel array;

illumination means for illuminating the target object comprising:

a light source for emitting a diverging light outwardly from a light source location;

a lens for bending the light including a first surface facing the light source and a second surface facing the target object for bending the light emitted by the light source to more uniformly illuminate the target object within the barcode reader's field of view;

wherein one of the first and second surfaces of the lens is generally spherically symmetric about a lens centerline that intersects the light source; and wherein the other one of the first and second surfaces of the lens is spherically non-symmetric about the lens centerline and is substantially symmetric with respect to at least two reflection planes that are perpendicular to each other.

14. The barcode reader of claim 13 wherein the generating curve of the first or second surface facing the target is substantially of the form $$z = \frac{Cr^2}{\left(1 + \sqrt{1 - (k+1)C^2 r^2}\right)} + \sum_i (a_i r^i + b_i x^i + c_i y^i).$$

* * * * *